(12) United States Patent
Hiraga et al.

(10) Patent No.: US 6,318,089 B1
(45) Date of Patent: *Nov. 20, 2001

(54) GAS TURBINE INLET AIR COOLING SYSTEM

(75) Inventors: Ichiro Hiraga; Shinichi Hoizumi, both of Hitachi (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,852

(22) Filed: Dec. 10, 1998

(30) Foreign Application Priority Data

Dec. 12, 1997 (JP) ................................... 9-362643

(51) Int. Cl.[7] ...................................................... F02C 1/00
(52) U.S. Cl. ........................... 60/728; 165/921; 165/297; 165/299; 165/293.7
(58) Field of Search .................................. 60/728, 39.23, 60/39.29; 165/921, 297, 299, 293.7

(56) References Cited

U.S. PATENT DOCUMENTS 3,978,663 * 9/1976 Mandrin et al. ................... 60/39.67
5,335,708 * 8/1994 Murakami et al. ..................... 165/1
5,758,502 * 6/1998 Utamura et al. ..................... 60/728

FOREIGN PATENT DOCUMENTS 9-119321 5/1997 (JP) .
9-195797 7/1997 (JP) .

* cited by examiner

Primary Examiner—Charles G. Freay
(74) Attorney, Agent, or Firm—Mattingly, Stanger & Malur, P.C.

(57) ABSTRACT

In a gas turbine inlet air cooling system that includes a heat exchanger to cool gas turbine inlet air which is taken from the atmosphere, by using chilled cooling water and a gas turbine using gas turbine inlet air as air for combustion and a chilled refrigerant supply apparatus to supply the chilled cooling water to the heat exchanger, the gas turbine inlet air cooling system has an adjustment valve that makes the cooling water of the cooling water return pipe heated by the heat exchanger join the chilled cooling water of the cooling water supply pipe that is supplied from the chilled refrigerant supply equipment. The gas turbine inlet air cooling system detects the temperature of the cooling water that is supplied to the heat exchanger with a temperature detector and controls the temperature of the cooling water by adjusting the opening of the adjustment valve. The present invention improves the gas turbine output by repressing the occurrence of drain water in the heat exchanger controlling the chilled refrigerant temperature to be supplied to the heat exchanger that cools the gas turbine inlet air.

6 Claims, 15 Drawing Sheets

GAS TURBINE INLET AIR COOLING SYSTEM

BACKGROUND OF THE INVENTION

The present invention is concerned with a gas turbine inlet air cooling system, and more particularly, concerns a cooling medium control technology of a heat exchanger for cooling gas turbine inlet air.

In a conventional gas turbine inlet air cooling system (hereafter referred to as the system), there is a method of adjusting the flow of a chilled refrigerant by a temperature detection signal of gas turbine inlet air and a detection signal of a gas turbine generation of electricity output to control the chilled refrigerant that is supplied to the heat exchanger that cools gas turbine inlet air. Such a chilled refrigerant flow adjustment system is disclosed in Japanese patent Laid-open Publication, 9-119321. There is another system that sets a chilled refrigerant temperature by an ambient temperature, an ambient humidity and a temperature detection signal of gas turbine inlet air. Such a system that sets the temperature of the chilled refrigerant is disclosed in Japanese patent Laid-open Publication 9-195797.

Whereas a chilled refrigerant is supplied to a heat exchanger that cools a gas turbine inlet air, when the difference of the ambient temperature and the chilled refrigerant temperature is large, condensation of steam in the atmosphere generally occurs, resulting in water drainage. Because part of a chilled refrigerant is used for latent heat load, water generation becomes the heat loss in the gas turbine inlet air cooling. Moreover, output of the gas turbine decreases, and efficiency is reduced so that the pressure loss of the gas turbine inlet air that passes the heat exchanger increases. In addition, the water may drain and contact the gas turbine compressor, thus decreasing its efficiency.

On the other hand, if the heat exchanger does not change or condense steam in the atmosphere to water, the minimum temperature in the outlet of the heat exchanger of the gas turbine inlet air is limited to the temperature of the chilled refrigerant that is supplied to the heat exchanger and only sensible heat is involved. It is desirable to reduce the unit price of generation of electricity where a system is operated all the round year. It is necessary, however, to set a refrigerant temperature at a temperature that takes into consideration the ambient temperature of winter to plan year round operation of the system so that the inlet air temperature depends on the chilled refrigerant temperature. Therefore, it is difficult to obtain economical operation of the system in the summer in view of the limitation of the hardware of the gas turbine with the refrigerant temperature during the winter.

The system disclosed in Japanese patent Laid-open Publication 9-195797 has a system that causes a refrigerant warmed by a heat exchanger to join the chilled refrigerant to be supplied from the chilled refrigerant supply apparatus. Such a system is an air cooling system that does not exchange excessive heat by controlling the temperature of a chilled refrigerant more than the dew point temperature of the steam of gas turbine inlet air. Thus, only sensible heat is removed.

For example, because a dew point temperature is 21.4 degrees centigrade when an ambient temperature is 30 degrees centigrade and ambient relative humidity is 60%, the refrigerant temperature becomes 21.4 degrees centigrade or more. Because the temperature difference of the gas turbine inlet air temperature and the chilled refrigerant temperature is small in the system, when it is compared with a case that the temperature of a chilled refrigerant is lower than the dew point temperature of gas turbine inlet air, the heat exchanger generally must be larger in size, and the chilled refrigerant flow increases. When a chilled refrigerant flow increases, bigger sized pumps and piping are required. In addition, when the heat exchanger becomes larger, gas turbine inlet air pressure loss increases, and the output of the gas turbine decreases.

SUMMARY OF THE INVENTION

The object of the present invention is to improve gas turbine output by repressing the occurrence of a water drainage in the heat exchanger controlling the temperature of the chilled refrigerant for cooling the gas turbine inlet air.

The present invention includes a control valve that mixes or combines a refrigerant warmed in a heat exchanger with a chilled refrigerant to be supplied from a chilled refrigerant supply apparatus. The temperature of the mixed refrigerant that is supplied to the heat exchanger is detected, and the opening of said control valve is adjusted by said temperature.

Furthermore, the present invention includes a setting means for setting or controlling the temperature of the refrigerant that is supplied to the heat exchanger in accordance with the ambient temperature, ambient humidity, and the gas turbine compressor inlet air temperature or an output of a gas turbine generator in advance. Moreover, the present invention has a means of comparing the temperature of a refrigerant set in advance and the temperature of the refrigerant that is supplied to a heat exchanger. The setting means sets the temperature command gradationally or continuously according to the ambient temperature, the ambient humidity, and the gas turbine compressor inlet air temperature or the output of a gas turbine generator. According to another aspect of the invention, the setting means is set by the refrigerant temperature or chart that sets said temperature according to the ambient temperature and the ambient humidity.

These and other features and advantages of the present invention will become more apparent with reference to the following detailed description and drawings.

DETAILED DESCRIPTION OF THE PREFERRED EMBODIMENT

Figure 1:
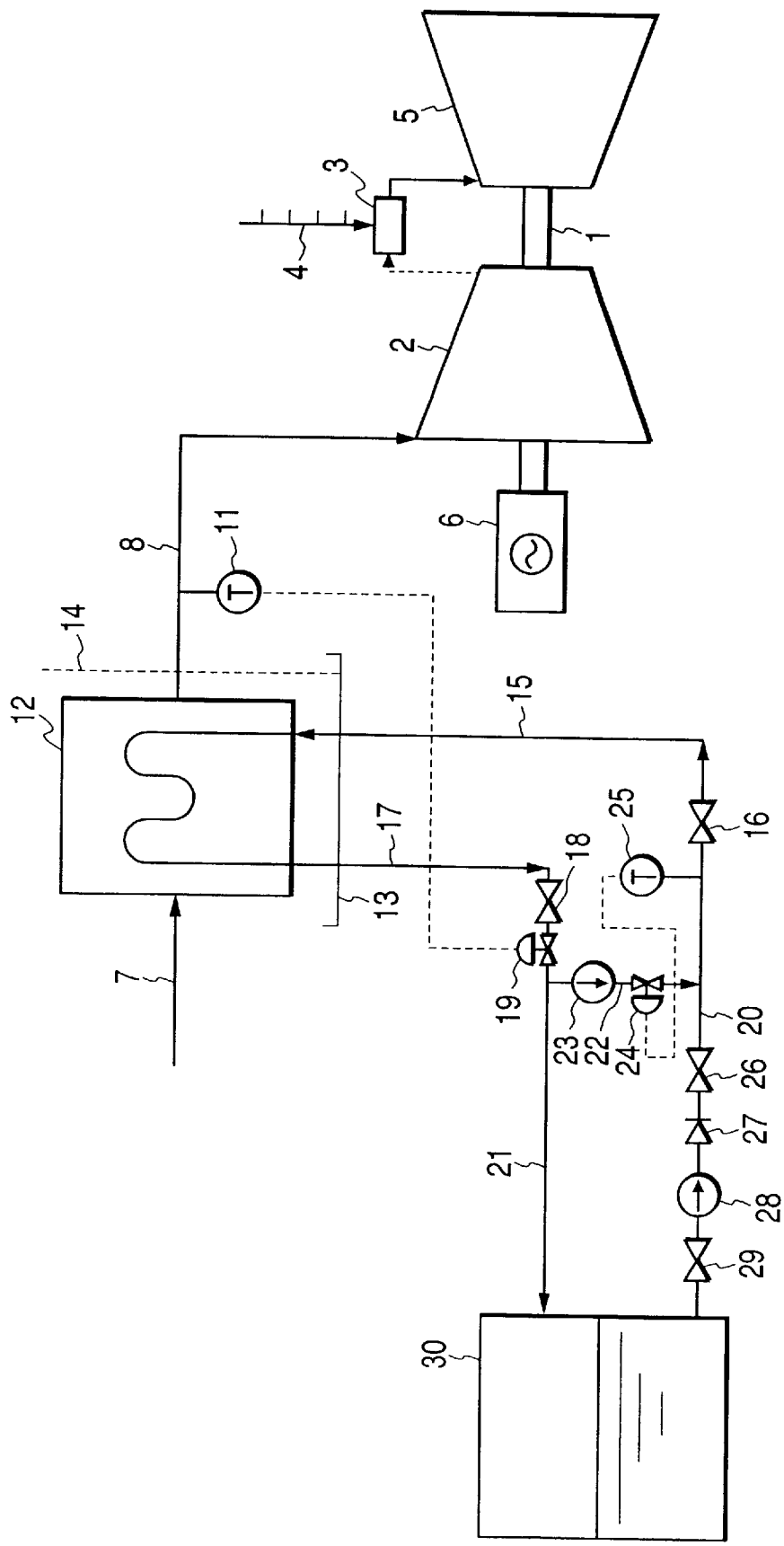
FIG. 1 is a schematic diagram of a gas turbine inlet air cooling system of a first embodiment of the present invention.

FIG. 1 illustrates a gas turbine inlet air cooling system of a first embodiment of the present invention. In FIG. 1, the gas turbine inlet air cooling system has a gas turbine body 1, an air compressor 2, a combustor 3, a gas turbine 5, a gas turbine generator 6, a heat exchanger 12 and an iced water tank 30.

In the gas turbine body 1, gas turbine inlet air 7 is cooled by the heat exchanger 12, the cooled gas turbine inlet air 8 is sent to the air compressor 2, the inlet air 8 is compressed by the air compressor 2 and the compressed air is introduced into the combustor 3. Fuel such as natural gas supplied to the combustor 3 from a fuel supply system 4 is combusted by the compressed air, and a high temperature combusted gas is obtained. This high temperature combusted gas is supplied to the gas turbine 5, and drives the gas turbine generator 6 set on the same axis with the gas turbine 5 and the air compressor 2 and generates an electrical output.

Chilled cooling water supplied to the heat exchanger 12 is sent from the iced water tank 30 via a cooling water supply pipe shutoff valve 29, a cooling water supply pump 28, a cooling water supply pipe check valve 27, a cooling water supply pipe shutoff valve 26, a cooling water supply pipe 20, a cooling water supply pipe shutoff valve 16 and a cooling water supply pipe 15.

In the heat exchanger 12, the gas turbine inlet air 7 is cooled by the chilled cooling water, and the cooling water warmed by the heat exchanger is recovered to the iced water tank 30 via a cooling water return pipe 17, a cooling water return pipe shutoff valve 18, a cooling water flow adjustment valve 19 and a cooling water return pipe 21. Simultaneously, part or all of the warmed cooling water may be branched from the cooling water return pipe 21 and combined with the chilled cooling water of cooling water supply pipe 20 via a cooling water circulation pump 23, a control valve 24 for cooling water circulating flow and a cooling water circulation water pipe 22.

The cooling water flow that is supplied to the heat exchanger 12 may be varied by utilizing the cooling water flow adjustment valve 19 by sending a signal from a temperature detector 11 for detecting the temperature of the gas turbine compressor inlet air 8. Thus, the temperature of the gas turbine compressor inlet air 8 is regulated. The amount of warmed cooling water flow that joins the chilled cooling water is controlled by the control valve 24 of the cooling water circulating flow by sending a signal from a temperature detector 25 for detecting the temperature of the chilled cooling water that flows into the heat exchanger 12. Thus the temperature of the chilled cooling water that flows into the heat exchanger 12 is regulated.

In the heat exchanger 12 that cools the gas turbine inlet air 7, steam in the atmosphere is condensed into water, and water drainage occurs. Accordingly, latent head is removed when the steam is condensed into water as well as the sensible heat removed prior to the condensation of steam into water. The water is recovered to a drain pot 13. To prevent water from scattering on the air compressor 2, a demister 14 is installed in the heat exchanger 12.

The temperature control of the chilled cooling water that is supplied to the heat exchanger 12 in this embodiment is enabled by making part or all of the warmed cooling water that is returned from the heat exchanger 12 join chilled cooling water via the cooling water circulation water pipe 22. The difference of the temperature of gas turbine inlet air 7 that is directed to the heat exchanger 12 and the chilled cooling water that is supplied via the cooling water supply pipe 15 is adjusted, and the occurrence of water drainage in the heat exchanger 12 can be suppressed. As a latent result, a heat loss of gas turbine inlet air cooling by water generation can be reduced. For example, under a condition where the relative humidity of gas turbine inlet air 7 is 52% and the temperature of gas turbine inlet air 7 is 33.3 degrees centigrade, if the temperature of chilled cooling water is 2 degrees centigrade, the heat loss by generated water becomes about 18%. On the other hand, when the chilled cooling water temperature is warmed to 10 degrees centigrade, the heat loss by the water generation can be reduced to about 6%.

Moreover, by suppressing the occurrence of water generation, the inlet air pressure loss of gas turbine inlet air 7 that passes the heat exchanger 12 is reduced, and the gas turbine output can be improved. Generally, the gas turbine body 1 has characteristics that combustion air that is directed to the air compressor as an ambient temperature is a low temperature and becomes more dense, the weight flow per unit volume increases, and a high output is obtained. Thus, the output of the gas turbine is increased by directing the cooled gas turbine compressor inlet air 8 from the heat exchanger 12 to the air compressor 2.

The occurrence of water generation in the heat exchanger 12 causes the output of the gas turbine to reduce since a heat loss occurs, and inlet air pressure loss increases. As for the chilled cooling water temperature that is supplied to the heat exchanger 12, it is desirable that it is at a temperature sufficient to produce profitability. With this embodiment, adjusting the chilled cooling water to a satisfactory temperature is enabled.

Gas turbine compressor inlet air 8 is not usually cooled to below the chilled cooling water temperature that is supplied from the cooling water supply pipe 15. Therefore, it is desirable to minimize the unit price of generation of electricity by use of the system. Considering the system use in the winter from the point of view of which use all the year round of the system is effective, the temperature of chilled cooling water is made 0 degrees centigrade. The temperature of the chilled cooling water that is supplied from the cooling water supply pipe 15 can be made 0 degrees centigrade by using the iced water tank 30.

Figure 2:
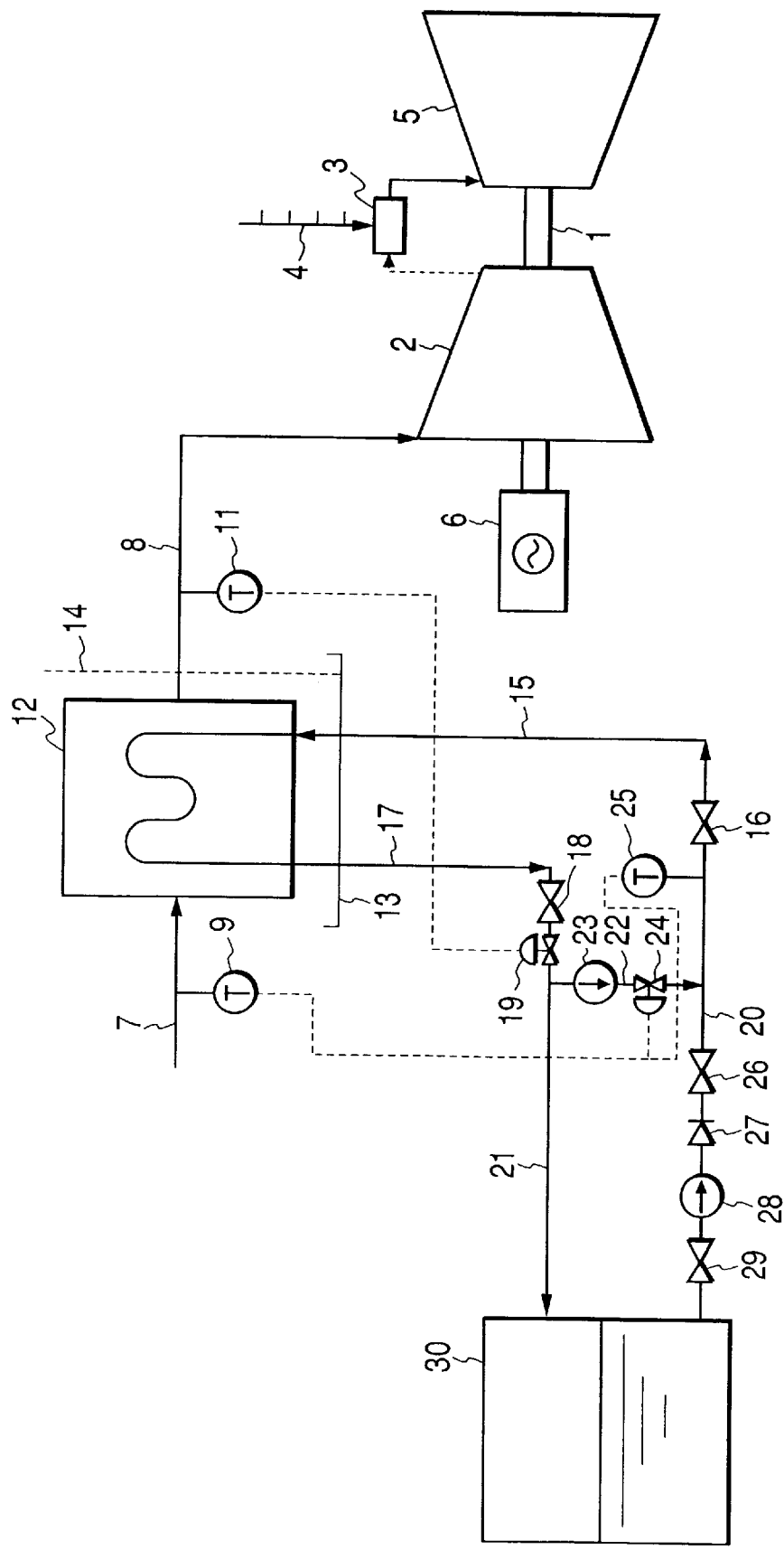
FIG. 2 is a schematic diagram of a gas turbine inlet air cooling system of a second embodiment of the present invention.

FIG. 2 shows a second embodiment of the present invention. When compared with FIG. 1, it is the feature of this embodiment that the temperature of the chilled cooling water that is supplied to the heat exchanger 12 is adjusted by a control valve 24 of cooling water circulating flow by sending a signal from a temperature detector 9 that detects the inlet air temperature of the gas turbine inlet air 7 in addition to sending a signal from the temperature detector 25.

Figure 3:
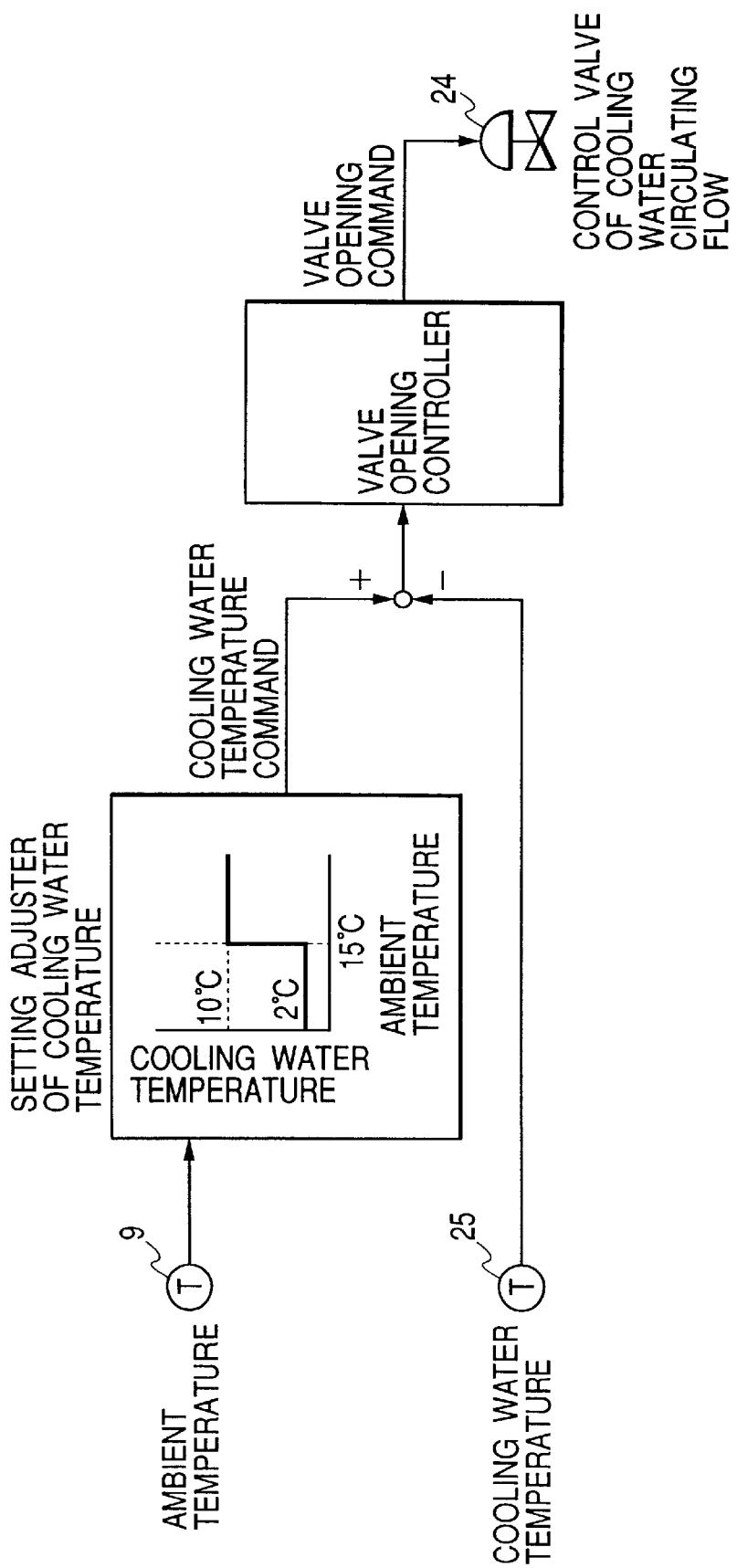
FIG. 3 and FIG. 4. are diagrams for explaining a method of controlling the second embodiment of the present invention.

In FIG. 3, a method of controlling the control valve 24 of cooling water circulating flow is explained. The temperature detector 9 detects the inlet air temperature (ambient temperature) of the gas turbine inlet air 7 and sends this temperature detection signal to a setting adjuster of cooling water temperature. The setting adjuster sends a cooling water temperature command set in advance based on the temperature detection signal. The valve opening controller sends a valve opening command according to the difference of the cooling water temperature command and a signal from the temperature detector 25 that detects the temperature of the cooling water to be supplied to the heat exchanger 12, and controls the control valve 24 of cooling water circulating flow.

In this case, when the temperature of the chilled cooling water that is supplied to the heat exchanger 12 is lower than the cooling water temperature command, by opening the control valve 24, the inflow from the warmed cooling water returned from the heat exchanger 12 to the chilled cooling water is increased and the temperature of the chilled cooling water is increased. When the temperature of the chilled cooling water that is supplied to the heat exchanger 12 is higher than the cooling water temperature command, by narrowing the control value 24 down, the inflow from the warmed cooling water returned from the heat exchanger 12 to the chilled cooling water is decreased, and the temperature of chilled cooling water is lowered.

Usually, significant water generation and drainage occurs in the heat exchanger 12, since the temperature difference of the gas turbine inlet air 7 that is directed to said heat exchanger 12 and chilled cooling water that is supplied via the cooling water supply pipe 15 is large. By detecting the inlet air temperature (the ambient temperature) of the gas turbine inlet air 7, controlling the control valve 24 and supplying the chilled cooling water of an optimum temperature according to an ambient temperature condition to the heat exchanger 12, the amount of water generation can be suppressed.

In the setting adjuster of cooling water temperature of this embodiment, the temperature of the chilled cooling water that is supplied to the heat exchanger 12 as a cooling water temperature command is set gradationally in advance. For example, in case an ambient temperature (the inlet air temperature of gas turbine inlet air 7) is 15 degrees centigrade or more, the temperature of chilled cooling water is made 10 degrees centigrade. In case an ambient temperature is less than 15 degrees centigrade, the temperature of chilled cooling water is made 2 degrees centigrade. Therefore, when the signal sent from the temperature detector 9 that detects the inlet air temperature of the gas turbine inlet air 7 is 15 degrees centigrade or more, 10 degrees centigrade is sent as the cooling water temperature command. In case the ambient temperature is less than 15 degrees centigrade, 2 degrees centigrade are sent as the cooling water temperature command.

Figure 4:
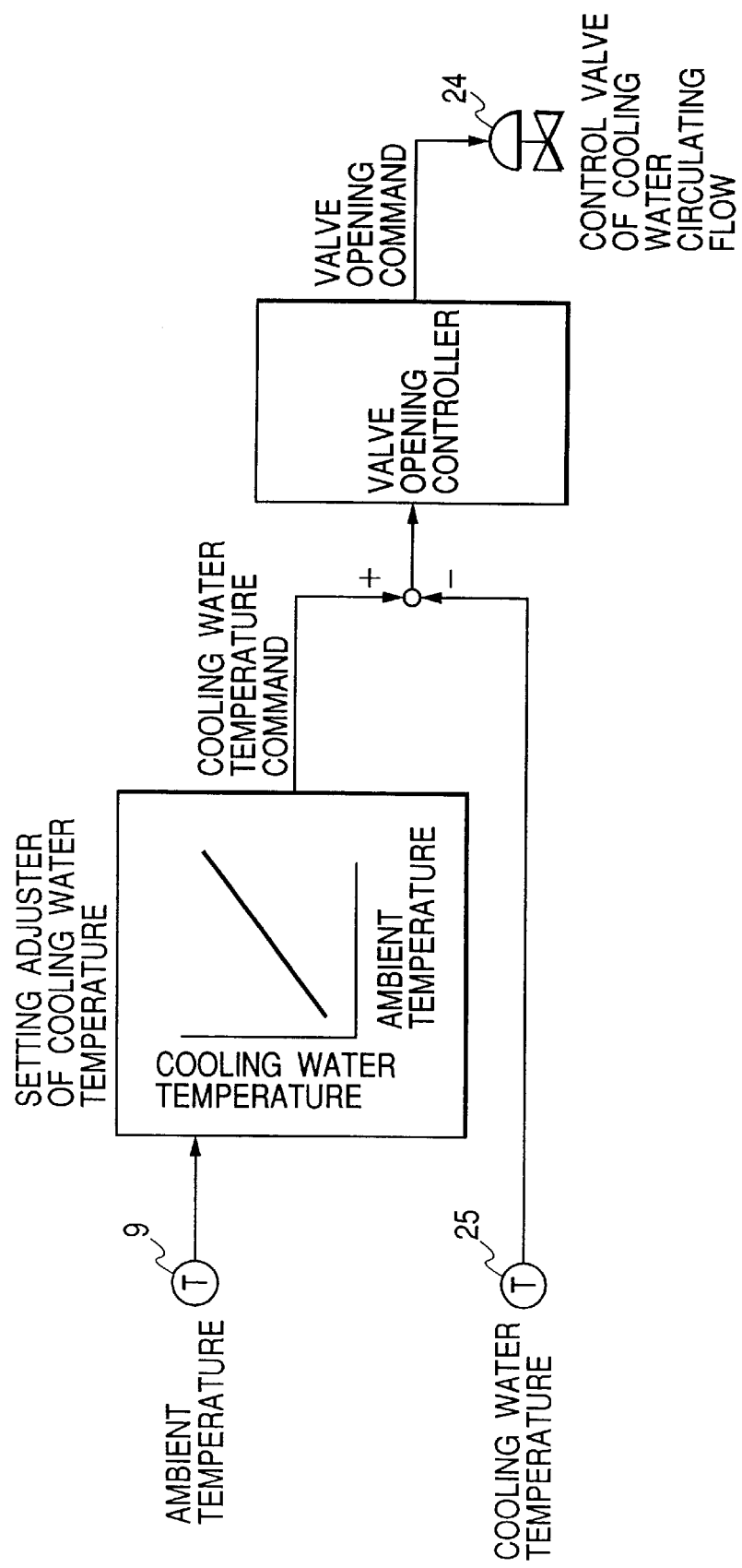

FIG. 4 shows another embodiment of the setting adjuster of cooling water temperature shown in FIG. 3. By this setting adjuster, a cooling water temperature command is set in advance whereby the chilled cooling water temperature to be supplied to the heat exchanger 12 continuously changes with respect to the ambient temperature (the inlet air temperature of the gas turbine inlet air 7). Therefore, the chilled cooling water temperature proportionally changes with the ambient temperature. The chilled cooling water temperature that changes, is sent as the cooling water temperature command.

Figure 5:
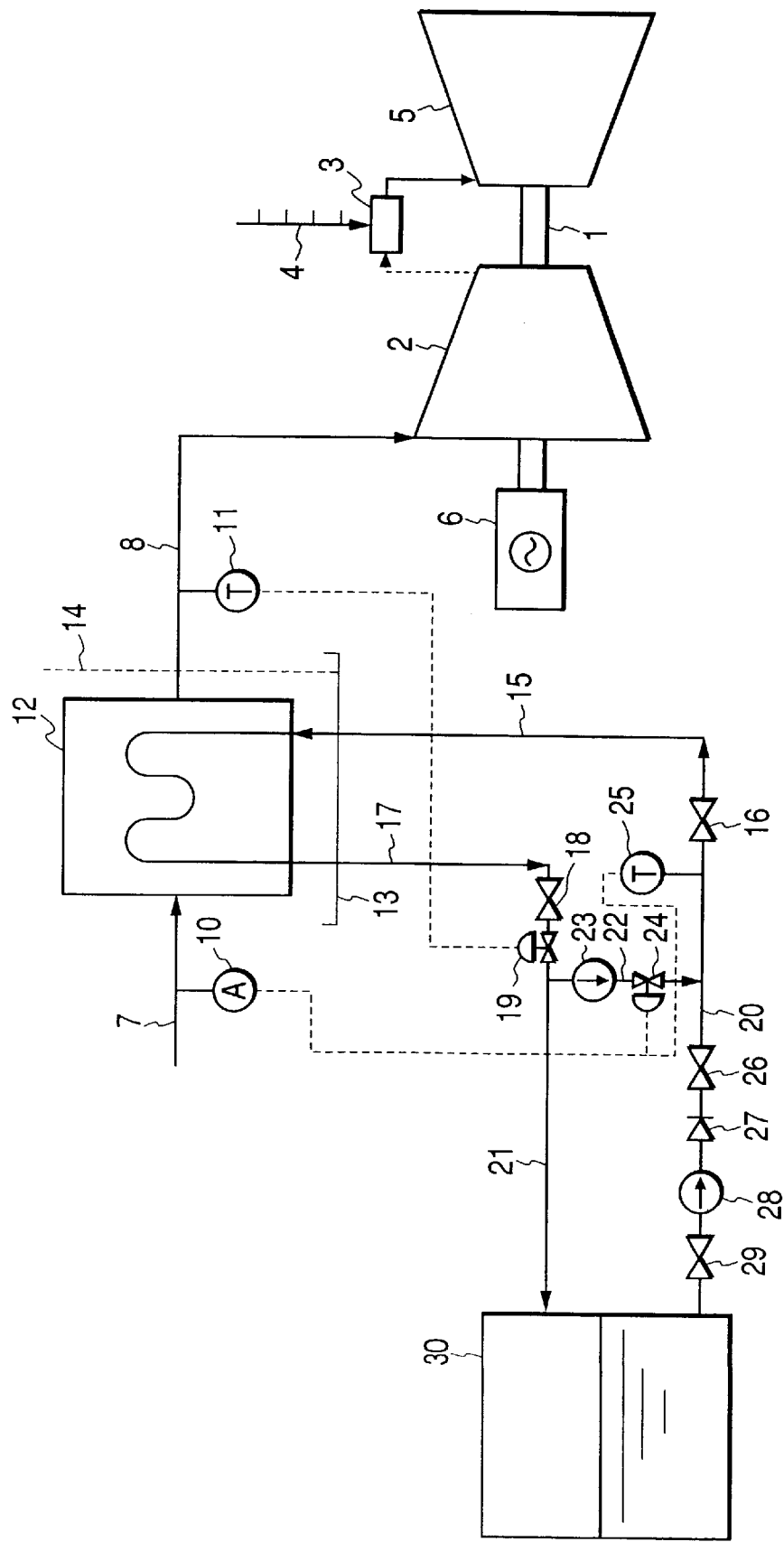
FIG. 5 is a schematic diagram of a gas turbine inlet air cooling system of a third embodiment of the present invention.

FIG. 5 shows a third embodiment of the present invention. When compared with FIG. 1, it is the feature of this embodiment that the chilled cooling water temperature that is supplied to the heat exchanger 12 is adjusted by control of the control valve 24 of cooling water circulating flow by sending a signal from a humidity detector 10 that detects the inlet air humidity of the gas turbine inlet air 7 in addition to sending a signal from the temperature detector 25. The ambient humidity is used for the control of the control valve 24 in this embodiment instead of the ambient temperature in FIG. 3. That is, the humidity detector 10 detects the inlet air humidity (the ambient relative humidity) of the gas turbine inlet air 7 and sends this humidity detection signal to the setting adjuster of cooling water temperature. The setting adjuster sends a cooling water temperature command set in advance, based on the humidity detection signal. The valve opening controller sends the valve opening command according to the difference of the cooling water temperature command and a signal sent from the temperature detector 25 that detects the temperature of the cooling water to be supplied to the heat exchanger 12, and controls the control valve 24.

Usually, as the inlet air humidity (the ambient relative humidity) of the gas turbine inlet air 7 is high, significant water generation occurs in the heat exchanger 12. In this embodiment, the control valve 24 is controlled by the inlet air humidity (the ambient relative humidity) detected in the gas turbine inlet air 7. Accordingly, the occurrence of water drainage can be suppressed, by supply to the heat exchanger 12 of the chilled cooling water of an optimum temperature according to an ambient humidity condition.

Figure 6:
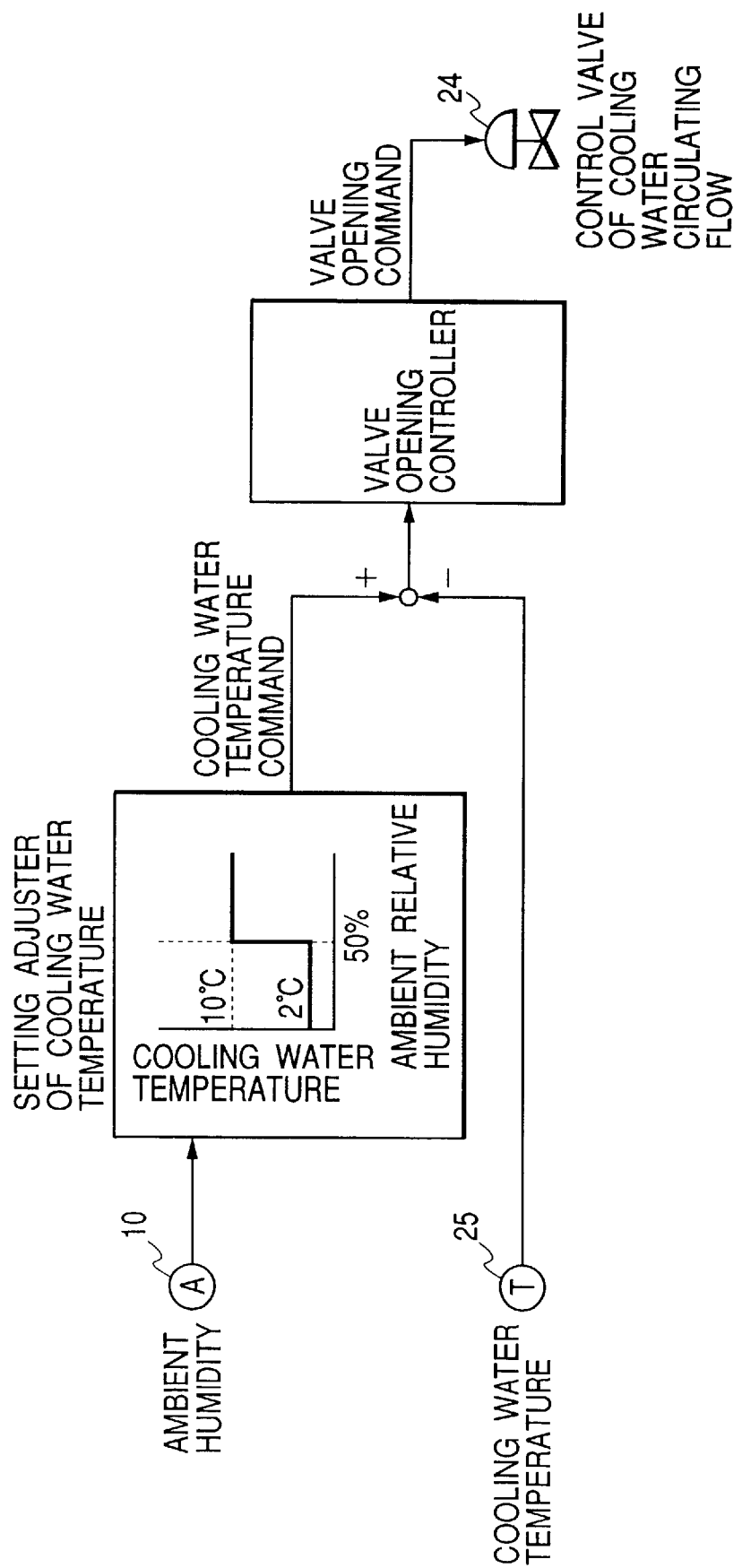
FIG. 6 is a diagram for explaining a method of controlling the third embodiment of the present invention.

FIG. 6 shows an example of a setting adjuster of cooling water temperature in the embodiment of FIG. 5. In this setting adjuster, the chilled cooling water temperature that is supplied to the heat exchanger 12 as the cooling water temperature command is set gradationally in advance. For example, where the ambient relative humidity (the inlet air humidity of the gas turbine inlet air 7) is 50% or more, the temperature of chilled cooling water is made 10 degrees centigrade, and where the ambient relative humidity is less than 50%, the chilled cooling water temperature is made 2 degrees centigrade. Therefore, when the signal sent from the humidity detector 10 that detects the inlet air humidity of the gas turbine inlet air 7 is 50% or more as the ambient relative humidity, 10 degrees centigrade are sent as a cooling water temperature degree command. In case the ambient relative humidity is less than 50%, 2 degrees centigrade are sent.

In another example of the setting adjuster in FIG. 6, the cooling water temperature command is set in advance whereby the chilled cooling water temperature to be supplied to the heat exchanger 12 continuously changes against the ambient relative humidity (the inlet air humidity of gas turbine inlet air 7). Therefore, the chilled cooling water temperature proportionally changes with the ambient relative humidity. This chilled cooling water temperature that changes is sent as the cooling water temperature command.

Figure 7:
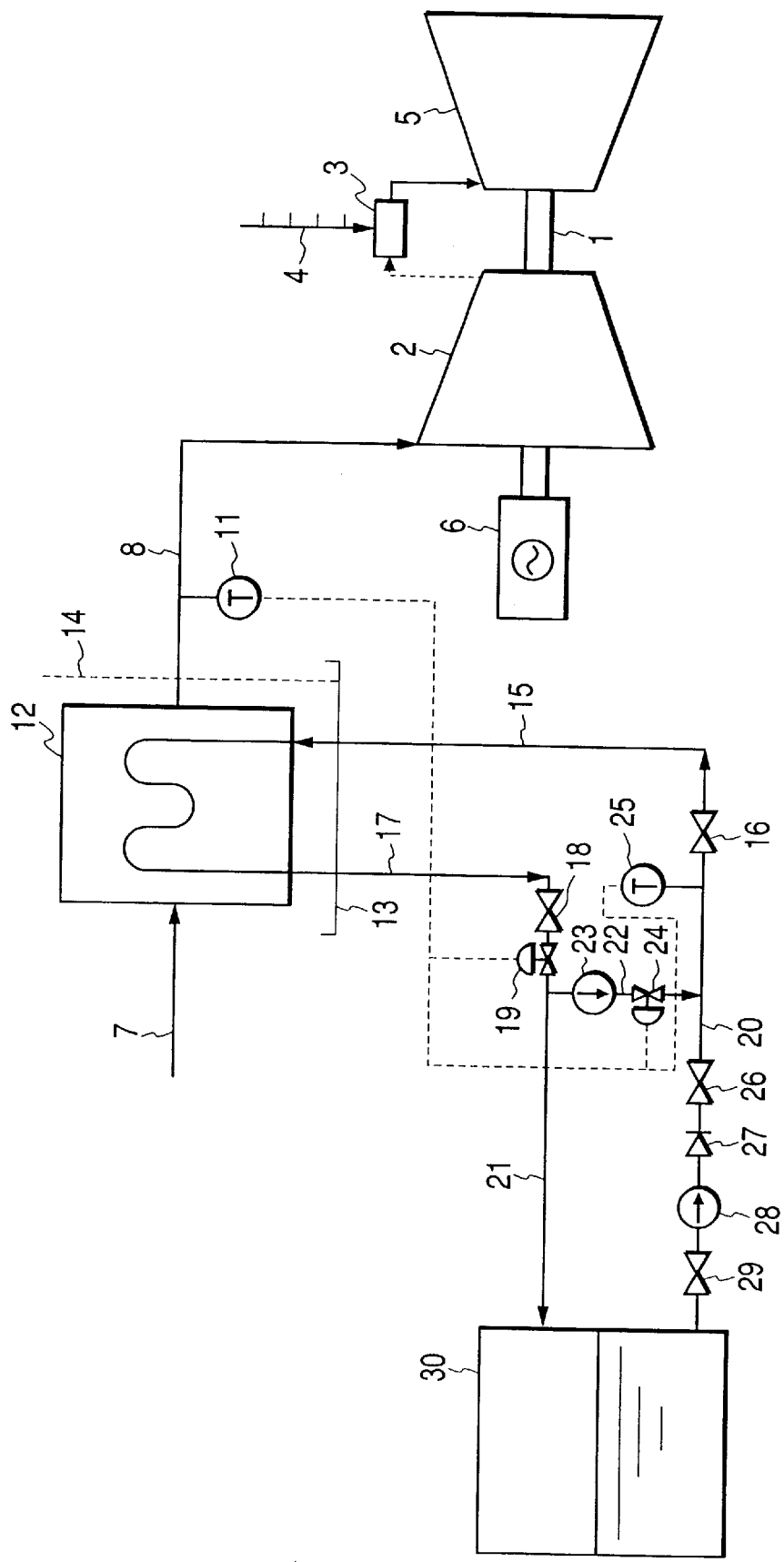
FIG. 7 is a schematic diagram of a gas turbine inlet air cooling system of a fourth embodiment of the present invention.

FIG. 7 shows a fourth embodiment of the present invention. When compared with FIG. 1, it is the feature of this embodiment that the chilled cooling water temperature that is supplied to the heat exchanger 12 is adjust ed by control of the control valve 24 by sending signal from a temperature detector 11 that detects the temperature of gas turbine compressor inlet air 8 after cooling in addition to the signal sent from the temperature detector 25. The temperature of gas turbine compressor inlet air is used for the control of the control valve 24 in this example instead of the ambient temperature in FIG. 3. The temperature detector 11 detects the temperature of gas turbine compressor inlet air 8 and sends this temperature detection signal to the setting adjuster. The setting adjuster sends a cooling water temperature command set in advance based on the temperature detection signal.

Because the fluctuation of the temperature of gas turbine compressor inlet air 8 usually has a direct influence on the increase or decrease of output of the gas turbine 5, if the control valve 24 is controlled by the temperature of the detected gas turbine compressor inlet air 8 like this embodiment, the chilled cooling water of the optimum temperature that suppresses the amount of water generation, considering the output of the gas turbine 5, can be supplied to the heat exchanger 12. Here, the embodiment of a setting adjuster can be realized by making the chilled cooling water temperature that is supplied to the heat exchanger 12 to be set in advance according to the temperature of the gas turbine compressor inlet air 8 and the cooling water temperature command in the same way as in FIG. 3, FIG. 4 and FIG. 6.

Figure 8:
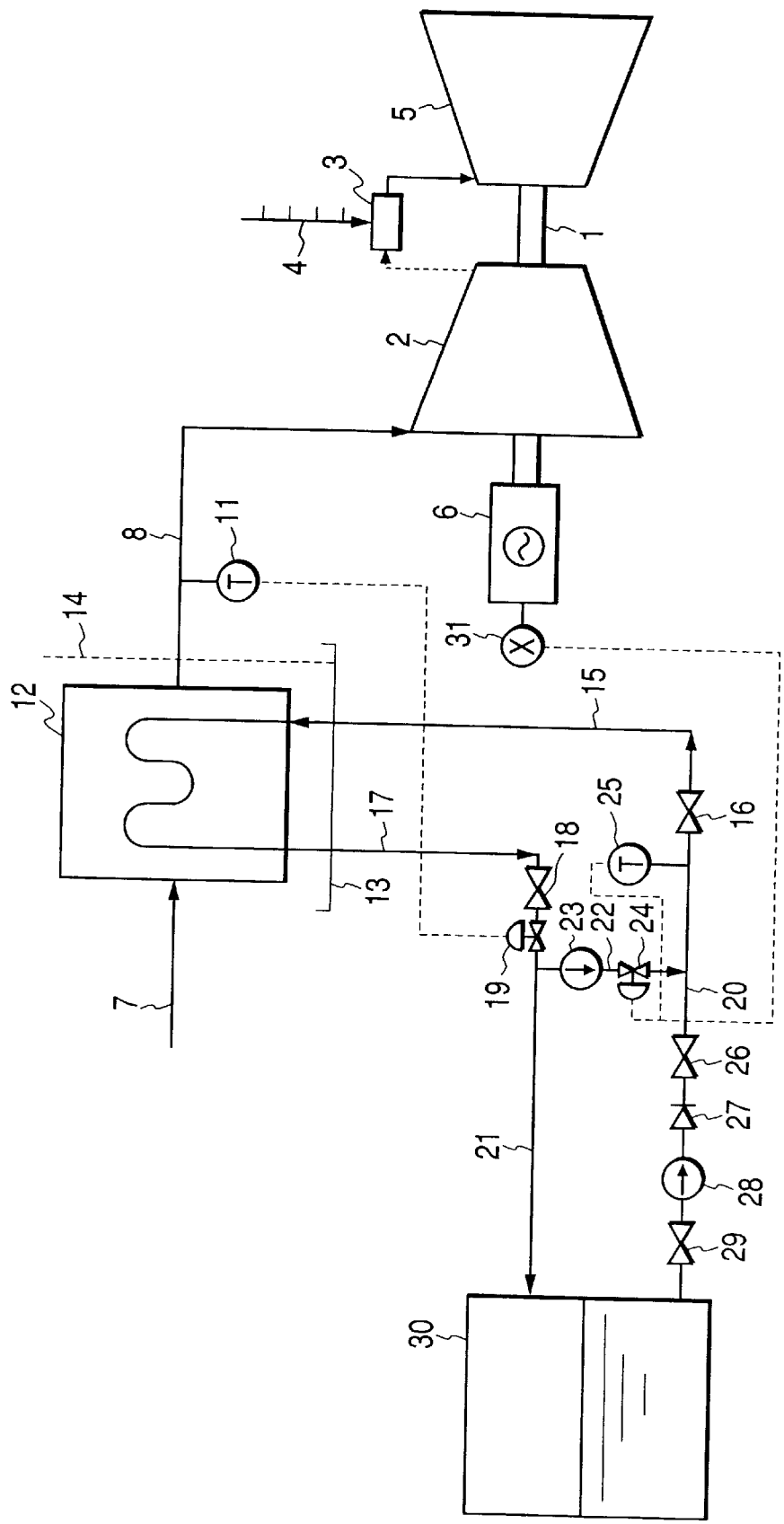
FIG. 8 is a schematic diagram of a gas turbine inlet air cooling system of a fifth embodiment of the present invention.

FIG. 8 shows a fifth embodiment of the present invention. When compared with FIG. 1, it is the feature of this embodiment that the chilled cooling water temperature that is supplied to the heat exchanger 12 is adjusted by control of the control valve 24 by sending a signal from a generator output detector 31 that detects output electricity generated in the gas turbine generator 6 in addition to the sending signal from the temperature detector 25. The generation of an electricity output signal is used for control of the control valve 24 in this embodiment instead of the ambient temperature in FIG. 3. That is, the generator output detector 31 detects output of electricity that a gas turbine generates and sends this generation of electricity output signal to the setting adjuster. The setting adjuster sends a cooling water temperature command set in advance based on the generation of an electricity output signal. Because the control valve 24 is controlled by the detected output that the gas turbine generates, this embodiment can suppress water generation based on electricity output and can control the chilled cooling water temperature promptly.

Likewise, with FIG. 3, FIG. 4 and FIG. 6, the chilled cooling water temperature that is supplied to the heat exchanger 12 according to the generator output is set in advance. Thus, this embodiment can be realized by making said temperature the cooling water temperature command.

Figure 9:
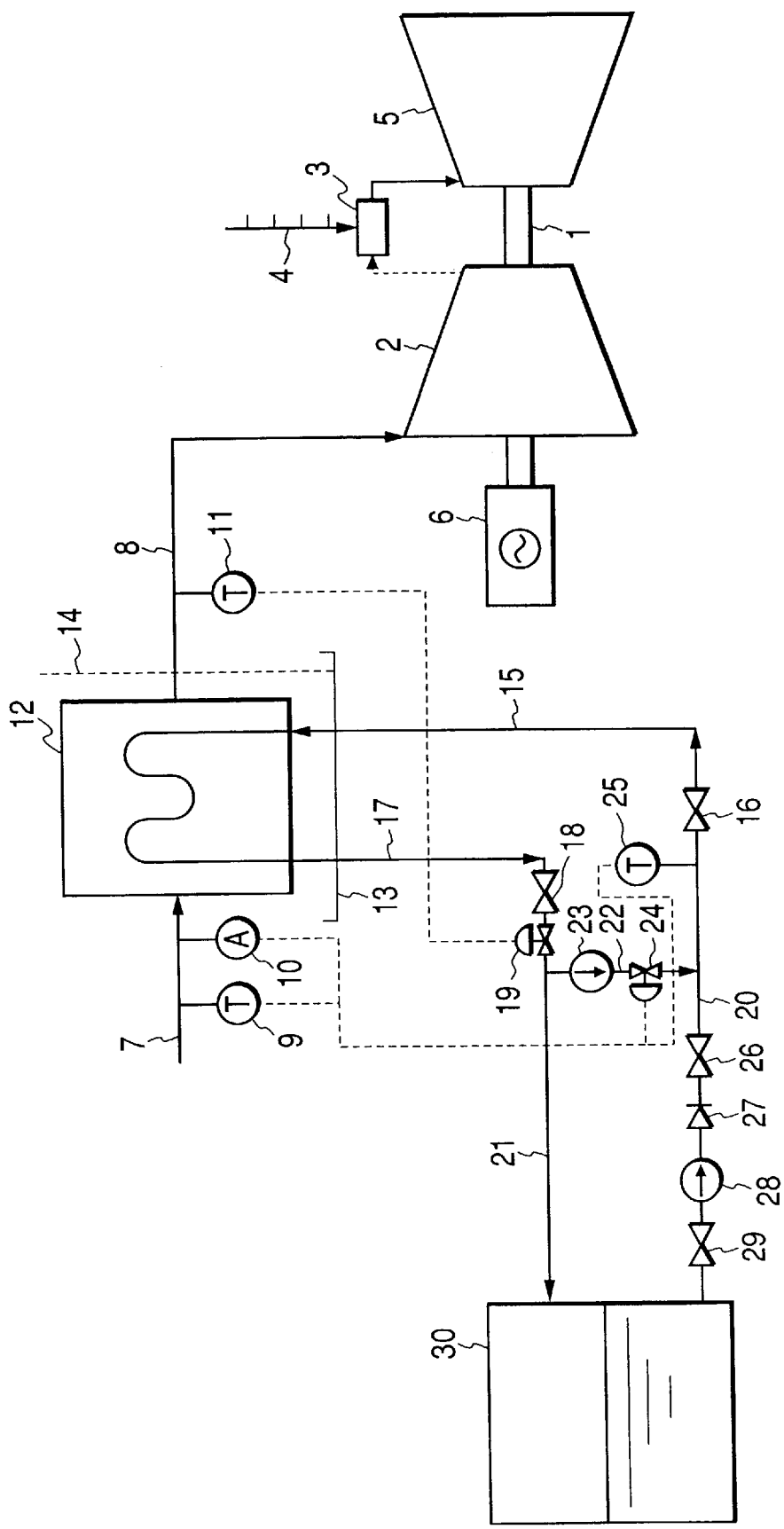
FIG. 9 is a schematic diagram of a gas turbine inlet air cooling system of a sixth embodiment of the present invention.

FIG. 9 shows a sixth embodiment of the present invention. When compared with FIG. 1, it is the feature of this embodiment that the chilled cooling water temperature that is supplied to the heat exchanger 12 is adjusted by control of the control valve 24 by sending a signal from the temperature detector 9 that detects the inlet air temperature of the gas turbine inlet air 7 and from the humidity detector 10 that detects the inlet air humidity in addition to the sending signal from the temperature detector 25.

Figure 10:
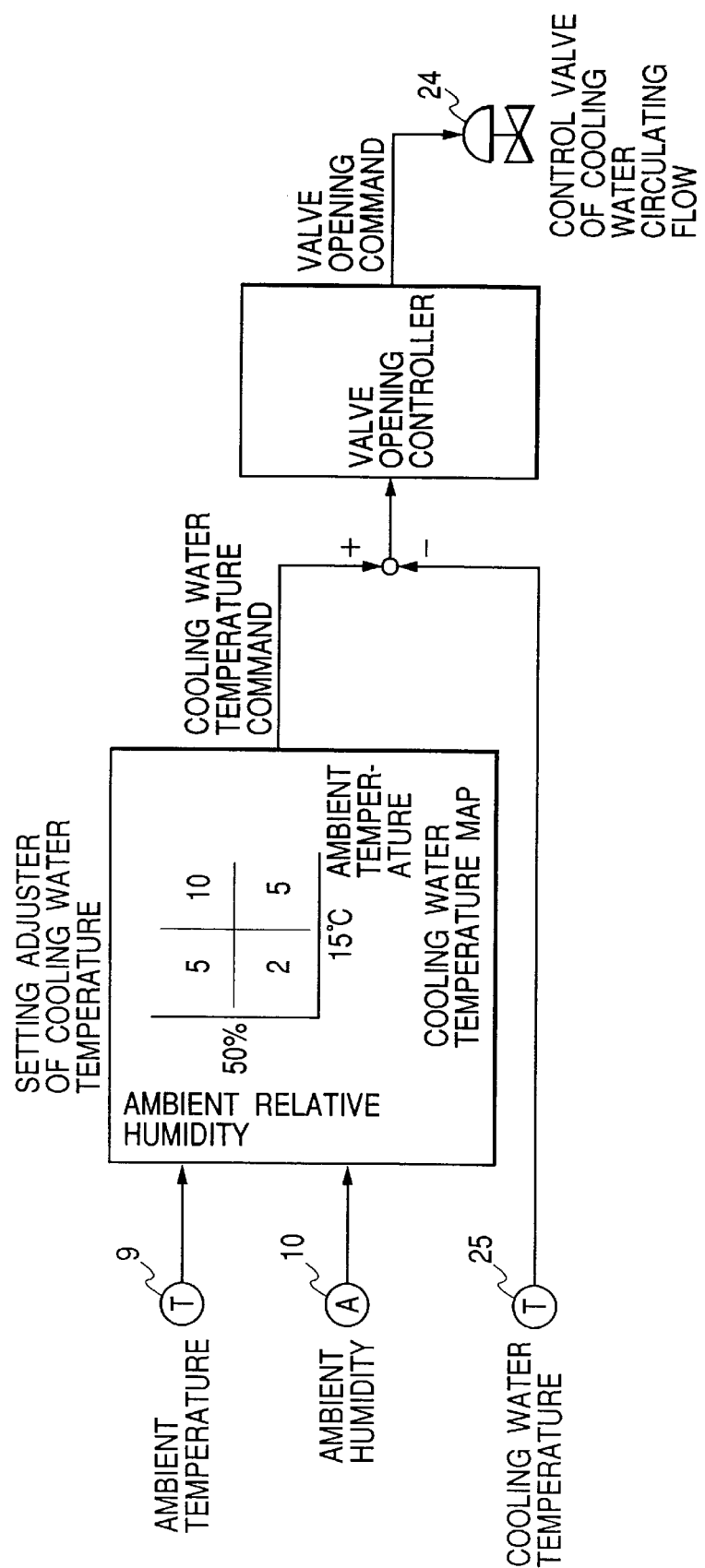
FIG. 10 is a diagram for explaining a method of controlling the sixth embodiment of the present invention.

FIG. 10 illustrates a method of controlling the control valve 24 in the embodiment of FIG. 9. The temperature detector 9 detects the inlet air temperature (ambient temperature) of the gas turbine inlet air 7 and sends this temperature detection signal to the setting adjuster. The humidity detector 10 detects the inlet air humidity (ambient relative humidity) of the gas turbine inlet air 7 and sends this temperature detection signal to the setting adjuster.

In the setting adjuster, a cooling water temperature map or chart is created in advance as a cooling water temperature command. For example, when an ambient relative humidity is 50% or more and an ambient temperature is 15 degrees centigrade or more, the chilled cooling water temperature that is supplied to the heat exchanger 12 is set to 10 degrees centigrade, and when the ambient temperature is less than 15 degrees centigrade, the chilled cooling water temperature is set to 5 degrees centigrade. When the ambient relative humidity is 50% or less and the ambient temperature is 15 degrees centigrade or more, the chilled cooling water temperature to be supplied to the heat exchanger 12 is set to 5 degrees centigrade, and when the ambient temperature is less than 15 degrees centigrade, the chilled cooling water temperature is set to 2 degrees centigrade. Therefore, the chilled cooling water temperature set in advance on the basis of the inlet air humidity and the inlet air temperature that the temperature detector 9 detected from the setting adjuster and the humidity detector 10 detected is sent as a cooling water temperature command.

A large quantity of water generation occurs in the heat exchanger 12, when the temperature difference of the gas turbine inlet air 7 that is directed to the heat exchanger 12 and chilled cooling water that is supplied via cooling water supply pipe 15 is large, and when the inlet air humidity of the gas turbine inlet air 7 is high. In the method of FIG. 10, by detecting the inlet air temperature (ambient temperature) of the gas turbine inlet air 7, controlling the control valve 24 and supplying chilled cooling water of an optimum temperature according to an ambient temperature and humidity condition to the heat exchanger 12, the occurrence of a large quantity of water generation can be suppressed.

Figure 11:
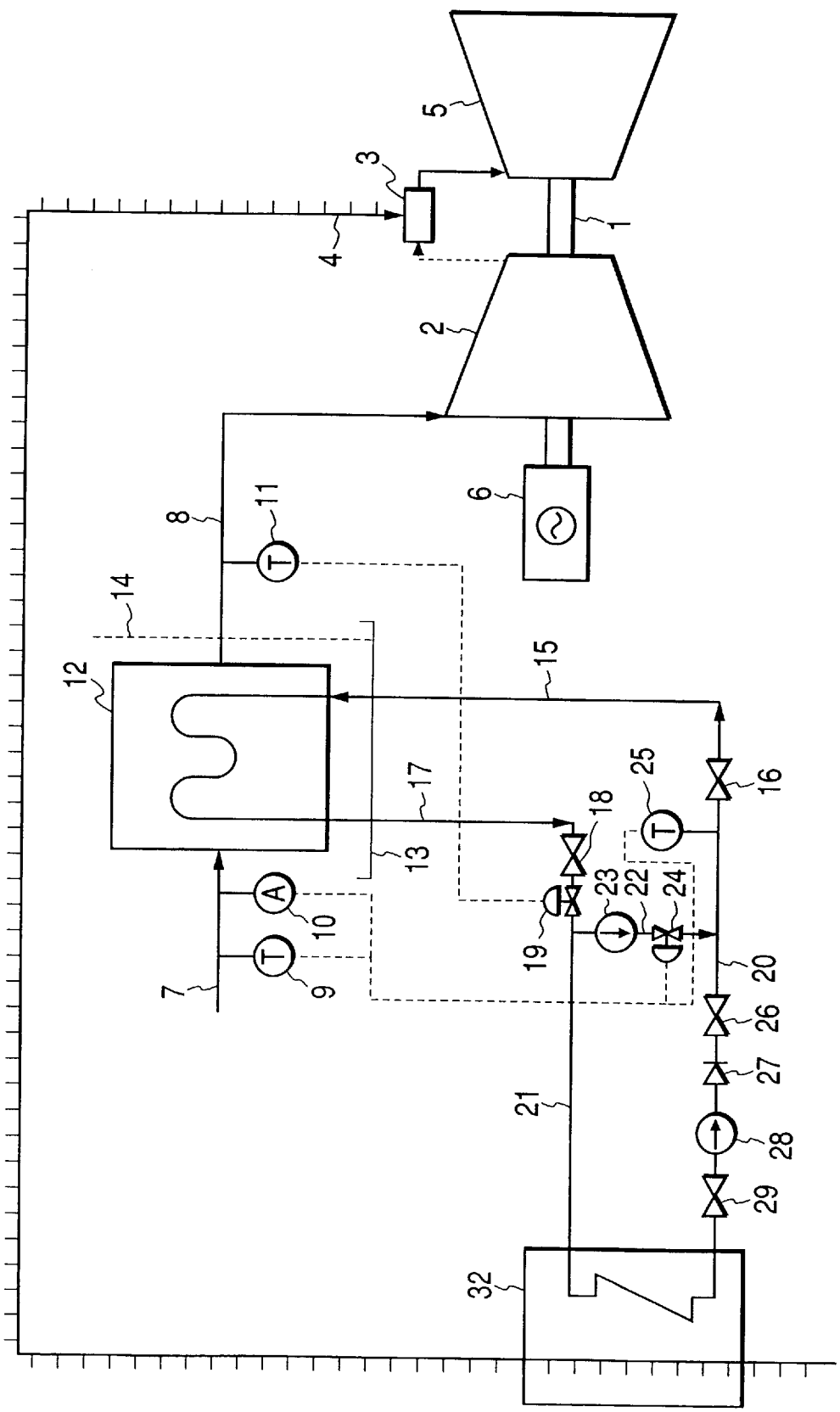
FIG. 11 is a schematic diagram of a gas turbine inlet air cooling system of a seventh embodiment of the present invention.

FIG. 11 shows a seventh embodiment of the present invention. When compared with FIG. 9, it is the feature of this embodiment that a LNG evaporator 32 is provided, and the warmed cooling water heated by the heat exchanger 12 is cooled by the LNG evaporation, and the natural gas that is evaporated by the heat of warmed cooling water is conducted to combustor 3 via fuel supply system 4.

The chilled cooling water cooled from the LNG evaporator 32 is sent to the heat exchanger 12, via a cooling water supply pipe shutoff valve 29, a cooling water supply pump 28, a cooling water supply pipe check valve 27, a cooling water supply pipe shutoff valve 26, a cooling water supply pipe 20, a cooling water supply pipe shutoff valve 16 and a cooling water supply pipe 15. The gas turbine compressor inlet air 8 is not cooled to below the degree of the chilled cooling water temperature that is supplied from cooling water supply pipe 15. Therefore, as for the chilled cooling water temperature that is supplied from the LNG evaporator 32 in consideration of system use in the winter, it is desirable that the temperature lower limit is made 0 degrees centigrade.

The warmed cooling water heated by cooling the gas turbine inlet air 7 in the heat exchanger 12 is recovered to the LNG evaporator 32 via the cooling water return pipe 17, the cooling water return pipe shutoff valve 18, the cooling water flow adjustment valve 19 and the cooling water return pipe 21. LNG is evaporated by using the heat of the warmed cooling water from the cooling water return pipe 21 in the LNG evaporator 32. The evaporated natural gas is directed to the combustor 3 via the fuel supply system 4. The cooling water cooled by evaporating LNG is directed to the heat exchanger 12 again via the cooling water supply pipe 20, etc.

In this embodiment, by passing the warmed cooling water from the heat exchanger in the LNG evaporator 32, when the warmed cooling water from the heat exchanger is cooled effectively, LNG can be evaporated. As a result, the warmed cooling water is cooled, and LNG is evaporated effectively, and the cost of generation of electricity by the inlet air cooling system use can be reduced. Moreover, the temperature of the chilled cooling water that is supplied from the cooling water supply pipe 15 can be made 0 degrees centigrade by using the LNG evaporator 32.

Figure 12:
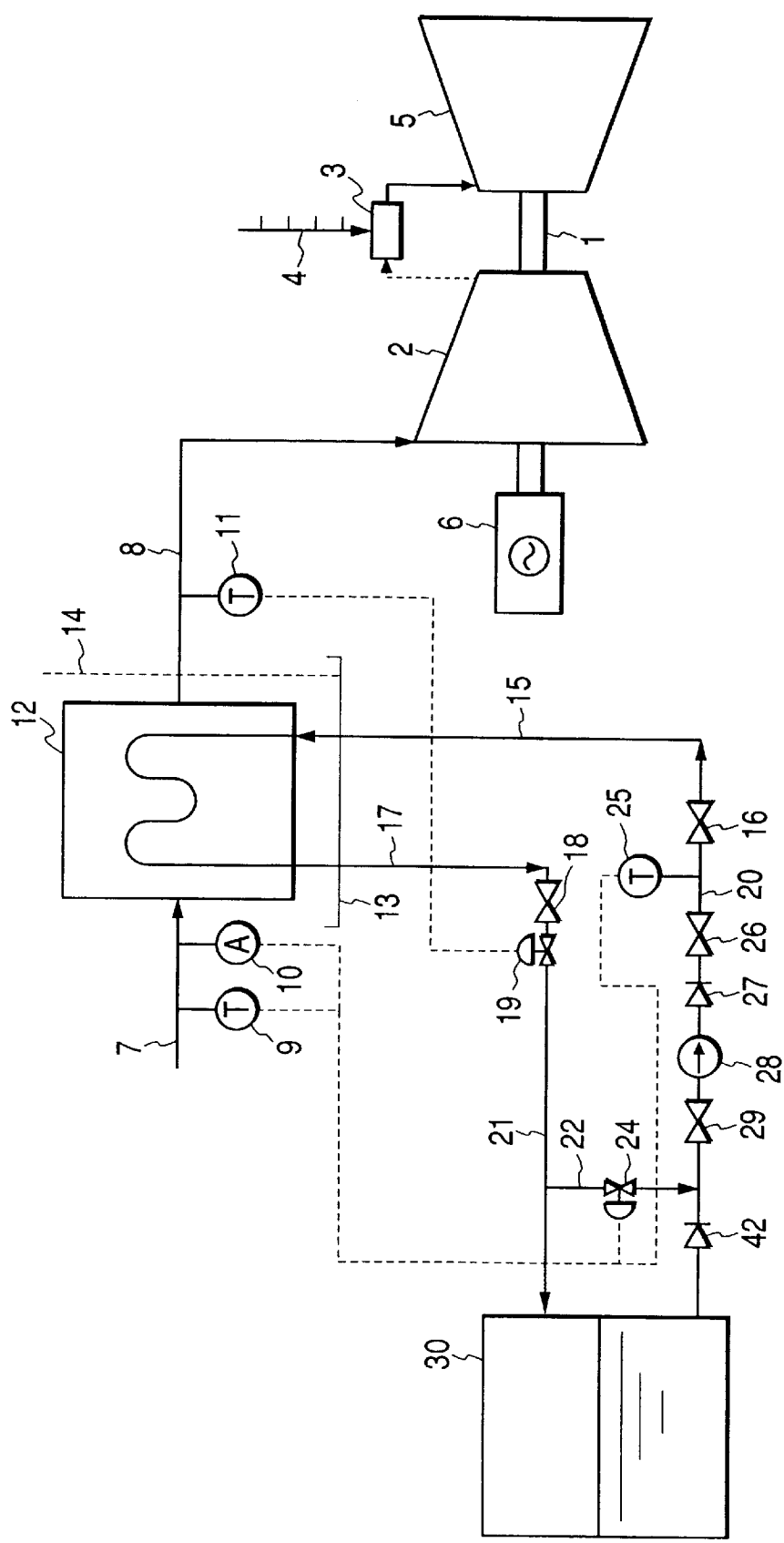
FIG. 12 is a schematic diagram of a gas turbine inlet air cooling system of an eighth embodiment of the present invention.

FIG. 12 shows an eighth embodiment of the present invention. When compared with FIG. 9, it is the feature of this embodiment that the control valve 24 is installed between the inlet and the outlet of an iced water tank 30. That is, it is the feature of this embodiment that the control valve 24 is installed between the cooling water return pipe 21 and the cooling water supply pipe 20 on the side of the iced water tank 30 of the cooling water supply pipe shutoff valve 29.

The cooling water warmed in the heat exchanger 12 is recovered to the iced water tank 30 via the cooling water return pipe 21. Simultaneously, the cooling part or all water branches from the inlet of the iced water tank 30 and joins the cooling water supply pipe 20 of the outlet of the iced water tank 30 via the control valve 24 and the cooling water circulating pipe 22. Because the hydraulic pressure of the cooling water that flows in the cooling water return pipe 21 is higher than the pressure of the cooling water that flows in the upper stream of the cooling water supply pump 28, the cooling water circulation pump 23 of FIG. 9 becomes unnecessary in this embodiment.

Figure 13:
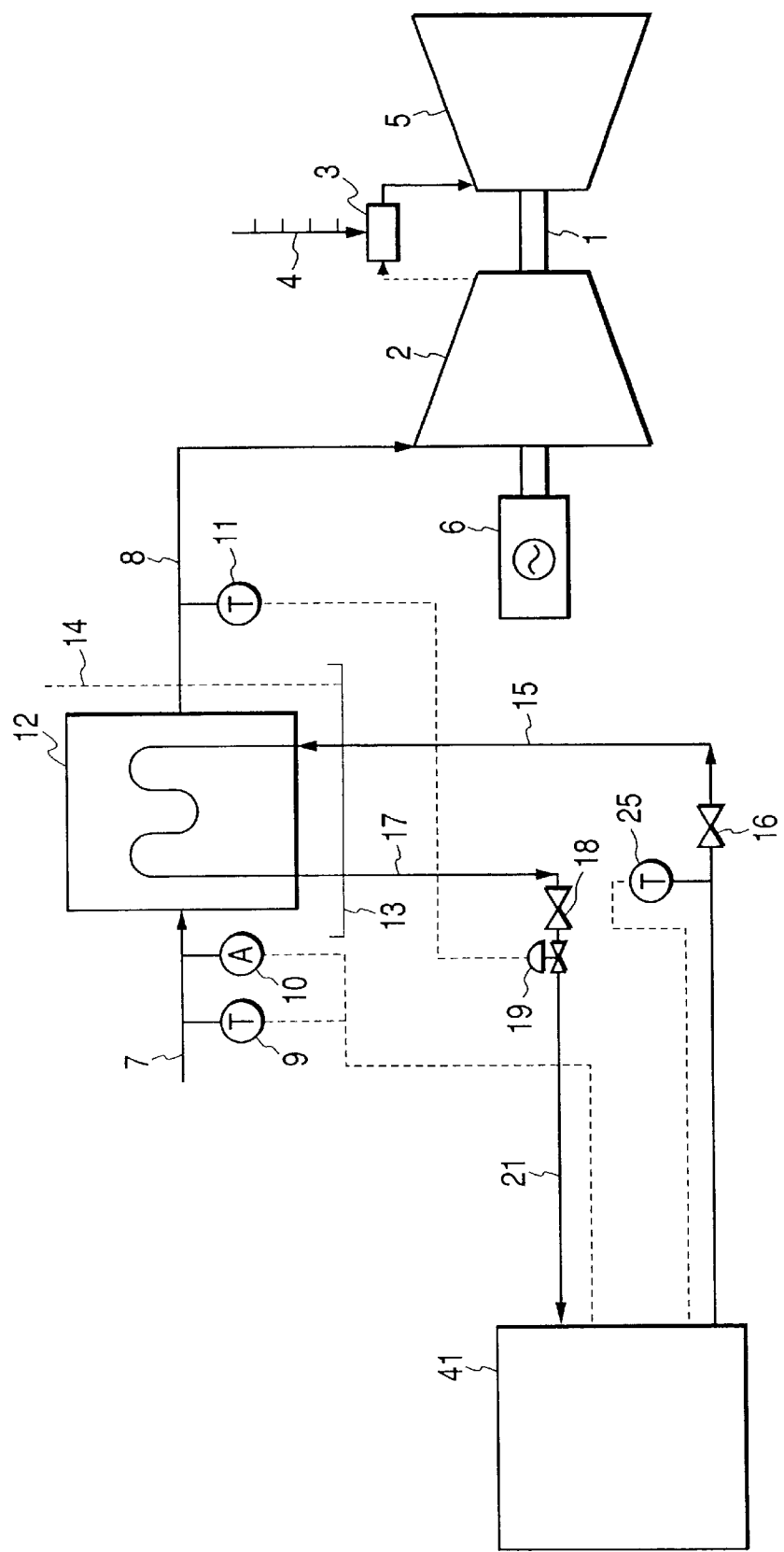
FIG. 13 is a schematic diagram of a gas turbine inlet air cooling system of a ninth embodiment of the present invention.

FIG. 13 shows a ninth embodiment of the present invention. When compared with FIG. 9, it is the feature of this embodiment that a cooling water supply apparatus 41 is installed instead of the iced water tank 30. In this embodiment, the chilled cooling water that is supplied to the heat exchanger 12 is sent from the cooling water supply apparatus 41 via the cooling water supply pipe shutoff valve 16 and the cooling water supply pipe 15. On the other hand, the warmed cooling water heated by cooling the gas turbine inlet air 7 in the heat exchanger 12 is recovered to the cooling water supply apparatus 41 via the cooling water return pipe 17, the cooling water return pipe shutoff valve 18, the cooling water flow control valve 19 and the cooling water return pipe 21. Because the cooling water supply apparatus 41 controls the cooling water temperature, it is possible to adjust the chilled cooling water temperature that is supplied to the heat exchanger 12.

Figure 14:
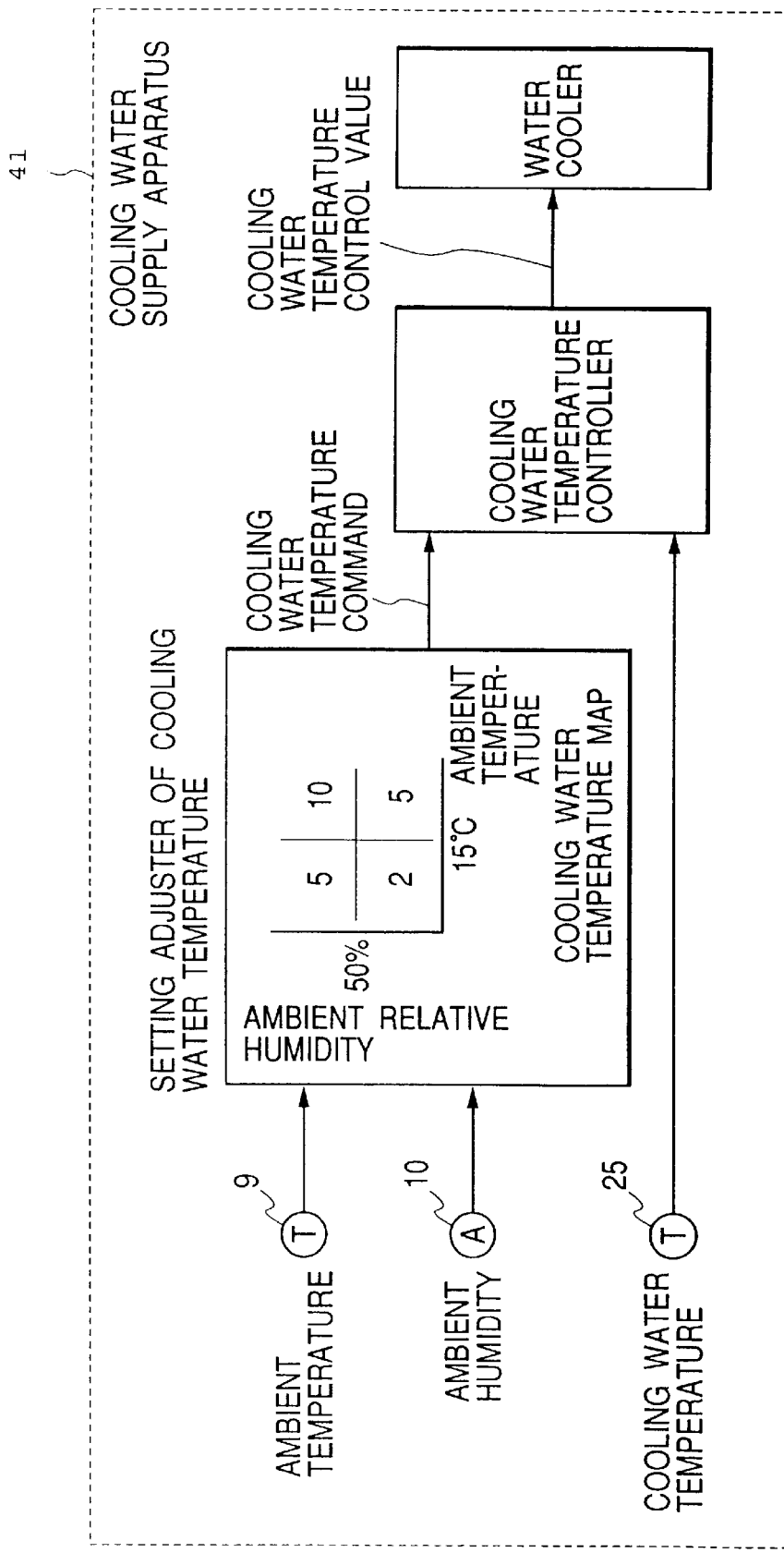
FIG. 14 is a diagram for explaining a method of controlling the ninth embodiment of the present invention.

In FIG. 14, an example of the cooling water supply apparatus 41 is shown. The cooling water supply apparatus 41 has a setting adjuster of cooling water temperature, a cooling water temperature controller and a water cooler. The cooling water supply apparatus 41 inputs the signal sent from the temperature detector 9 that detects the inlet air temperature (ambient temperature) of the gas turbine inlet air 7, the humidity detector 10 that detects the inlet air humidity (ambient humidity) of the gas turbine inlet air 7 and the temperature detector 25 that detects the temperature (cooling water temperature) of the chilled cooling water that flows into the heat exchanger 12.

In the setting adjuster, a cooling water temperature map or chart is created as a cooling water temperature command in advance. For example, when an ambient relative humidity is 50% or more and an ambient temperature is 15 degrees centigrade or more, the chilled cooling water temperature that is supplied to the heat exchanger 12 is set to 10 degrees centigrade, and in case the ambient temperature is less than 15 degrees centigrade, the chilled cooling water temperature is set to 5 degrees centigrade. When the ambient relative humidity is 50% or less, in the case where the ambient temperature is less than 15 degrees centigrade, the chilled cooling water temperature is set to 2 degrees centigrade.

When the ambient temperature and the ambient humidity are input into the setting adjuster, the chilled cooling water temperature set in advance on the basis of the ambient temperature and the ambient humidity is sent as a cooling water temperature command. The cooling water temperature controller takes the difference of the cooling water temperature command and the cooling water temperature that is sent from the temperature detector 25. When the chilled cooling water temperature to the heat exchanger 12 is lower than the cooling water temperature command, the cooling water temperature controller raises the chilled cooling water temperature. When the chilled cooling water temperature to the heat exchanger 12 is higher than the cooling water temperature command, the cooling water temperature controller drops the chilled cooling water temperature and outputs a cooling water temperature control. The water generates cooling water based on this cooling water temperature control value, and the cooling water is supplied from the cooling water supply apparatus 41. It is possible to control a gas turbine inlet air temperature of which, because the cooling water supply apparatus 41 controls the cooling water temperature that is supplied to the heat exchanger 12 directly, conformity is high.

Figure 15:
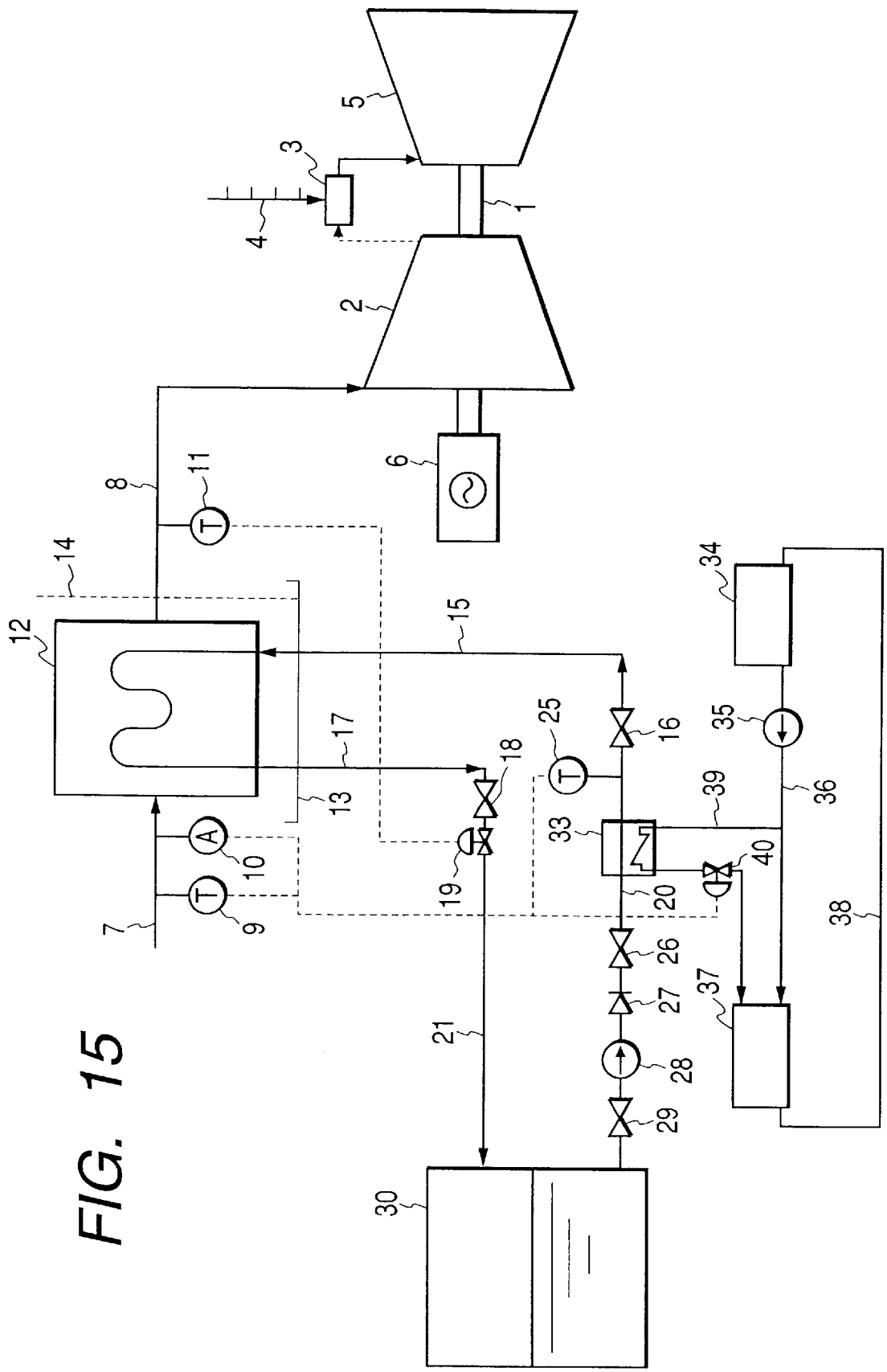
FIG. 15 is a schematic diagram of a gas turbine inlet air cooling system of a tenth embodiment of the present invention.

FIG. 15 shows a 10th embodiment of the present invention. When compared with FIG. 12, the control valve 24 is omitted, and a heat exchanger 33 is provided on the cooling water supply pipe 20. The heat exchanger 33 has a system for which the chilled cooling water that is supplied to the heat exchanger 12 that cools gas turbine inlet air 7 and the cooling water that cooled each device 34 in the power plant, exchange heat. Furthermore, it is a feature of this embodiment that cooling water flow control valve 40 to adjust the flow of the cooling water which cooled each device 34 in the power plant is provided.

The cooling water warmed by cooling each device 34 in the power plant is conducted to a water cooler 37 via a cooling water supply pump 35 and a cooling water tube 36. The cooling water cooled in the water cooler 37 is supplied to each device 34 in the power plant via the cooling water tube 38. The warmed cooling water from each device 34 in the power plant is directed to the water cooler 37 simultaneously via the heat exchanger 33 and the cooling water flow control valve 40 by the cooling water tube 39 that branches from the cooling water tube 36. At this time, the cooling part or all water warmed by each device 34 in the power plant, warms the chilled cooling water that is supplied to the heat exchanger 12 in the heat exchanger 33.

In this case, the cooling water flow control valve 40 is controlled on the basis of a signal sent from the temperature detector 9 for detecting the inlet air temperature of the gas turbine inlet air 7, the humidity detector 10 for detecting the inlet air humidity of the gas turbine inlet air 7 and the temperature detector 25 for detecting the chilled cooling water temperature that flows into the heat exchanger 12. By this cooling water flow control valve 40, the flow of warmed cooling water warmed by each device 34 in the power plant is controlled, and the chilled cooling water temperature that is supplied to the heat exchanger 12 is adjusted.

Because an existing cooling system is used for temperature control of the chilled cooling water to be supplied to the heat exchanger 12, this embodiment can cool the warmed cooling water of an existing cooling system by the chilled cooling water that is supplied to the heat exchanger 12. Therefore, temperature control of cooling water with economy and efficiency at the time of looking at the whole system for cooling in the power plant, is enabled.

Still more, in the embodiments shown in FIG. 11, FIG. 12, FIG. 13 and FIG. 15, instead of using the signals sent from the temperature detector 9 to detect the inlet air temperature of the gas turbine inlet air 7 and the humidity detector 10 to detect the inlet air humidity, the signal sent form the temperature detector 9 of the second embodiment shown in FIG. 2, the humidity detector 10 of the third embodiment shown in FIG. 5, the temperature detector 11 of the fourth embodiment shown in FIG. 7 or the generator output detector 31 of the fifth embodiment shown in Fig. can be used. Moreover, while each embodiment of the present invention used water fore the refrigerant that is supplied to the heat exchanger, a refrigerant other than water can be used. Also, the present invention can be applied to combined-generation of electricity apparatus using a gas turbine.

According to the present invention, the chilled cooling water temperature that is supplied to the heat exchanger can be controlled by making part or all of the warmed cooling water that is returned from the heat exchanger join chilled cooling water via the cooling water circulating pipe. therefore, the occurrence of a large quantity of water generation in the heat exchanger can be suppressed, and a heat loss of the gas turbine inlet air cooling by the water generation can be reduced.

What is claimed is:

1. An inlet air cooling system for a gas turbine comprising:
   a heat exchanger for cooling gas turbine inlet air which is taken from the atmosphere, by a refrigerant;
   a low temperature refrigerant supply apparatus for supplying the refrigerant to said heat exchanger;
   a first conduit connecting said low temperature refrigerant supply means with said heat exchanger;
   a second conduit connecting said heat exchanger with said low temperature refrigerant supply means;
   a third conduit connecting said first and second conduits;
   a control valve connected to said third conduit for regulating flow of the refrigerant in said second conduit returning from said heat exchanger to the refrigerant flowing out from said low temperature refrigerant supply apparatus in said first conduit;
   a detector for detecting the temperature of the refrigerant flowing in said first conduit from said low temperature refrigerant supply means; and
   means for adjusting an opening of said control valve in accordance with the temperature of the refrigerant detected by said detector in order to adjust the temperature of the refrigerant for removing latent heat and sensible heat, the temperature of the refrigerant being adjusted to a level whereby the level of latent heat removed is suppressed and kept to a minimum.

2. The inlet air cooling system of claim 1, which further comprises:
   a setting means for detecting an ambient temperature, and setting a temperature level for the refrigerant to be supplied to the heat exchanger through said first conduit according to said ambient temperature, and
   means for comparing the temperature of the refrigerant that said detector detected, with said temperature level.

3. The inlet air cooling system of claim 1, which further comprises:
   a setting means for detecting an ambient humidity and setting a temperature level for the refrigerant to be supplied to the heat exchanger through said first conduit according to said ambient humidity, and
   means for comparing the temperature of the refrigerant that said detector detected with said temperature level.

4. The inlet air cooling system of claim 1, which further comprises:
   a setting means for detecting a temperature of gas turbine compressor inlet air after cooling in said heat exchanger, and setting a temperature level for the refrigerant to be supplied to the heat exchanger through said first conduit according to said temperature of gas turbine compressor air inlet, and
   means for comparing the temperature of the refrigerant that said detector detected with said temperature level.

5. The inlet air cooling system of claim 1, which further comprises:
   a setting means for detecting an output of a gas turbine generator, and setting a temperature level for the refrigerant to be supplied to the heat exchanger through said first conduit according to said output, and
   means for comparing the temperature of the refrigerant that said detector detected with said temperature level.

6. The inlet air cooling system of claim 1, which further comprises:
   a setting means for detecting an ambient temperature and an ambient humidity, and setting a temperature level for the refrigerant to be supplied to the heat exchanger through said first conduit according to said ambient temperature and said ambient humidity, and
   means for comparing the temperature of the refrigerant that said detector detected with said temperature level.

* * * * *